United States Patent

Rabedeaux

[11] 4,290,419
[45] Sep. 22, 1981

[54] MULTI SYSTEMS SOLAR COLLECTOR

[76] Inventor: Richard W. Rabedeaux, 104 N. Second Ave. East, Newton, Iowa 50208

[21] Appl. No.: 52,850
[22] Filed: Jun. 28, 1979
[51] Int. Cl.³ .............................. F24J 3/02; E06B 7/12
[52] U.S. Cl. .................................. 126/450; 126/446; 52/171
[58] Field of Search ............... 126/432, 446, 450, 900, 126/448, 442; 52/172, 171; 428/34

[56] References Cited

U.S. PATENT DOCUMENTS

| | | | |
|---|---|---|---|
| 1,956,628 | 5/1934 | Rutishauser | 52/171 |
| 2,566,327 | 9/1951 | Hallock | 126/442 |
| 3,990,429 | 11/1976 | Mazzoni | 126/450 |
| 4,055,163 | 10/1977 | Costello | 126/450 |
| 4,096,861 | 6/1978 | Bowles | 126/422 |

FOREIGN PATENT DOCUMENTS

| | | | |
|---|---|---|---|
| 2344796 | 11/1977 | France | 126/450 |
| 197810 | 10/1978 | United Kingdom | 52/171 |

Primary Examiner—Samuel Scott
Assistant Examiner—G. Anderson
Attorney, Agent, or Firm—Henderson & Sturm

[57] ABSTRACT

This invention relates to solar collector apparatus in general and more specifically to a multi systems solar collector which has a unique design which allows the collector unit to absorb energy from radiation, conduction and convection. The device in question also utilizes a dry gas at higher than atmospheric pressure to form the working fluid for the convection heat transfer.

5 Claims, 4 Drawing Figures

U.S. Patent  Sep. 22, 1981  4,290,419
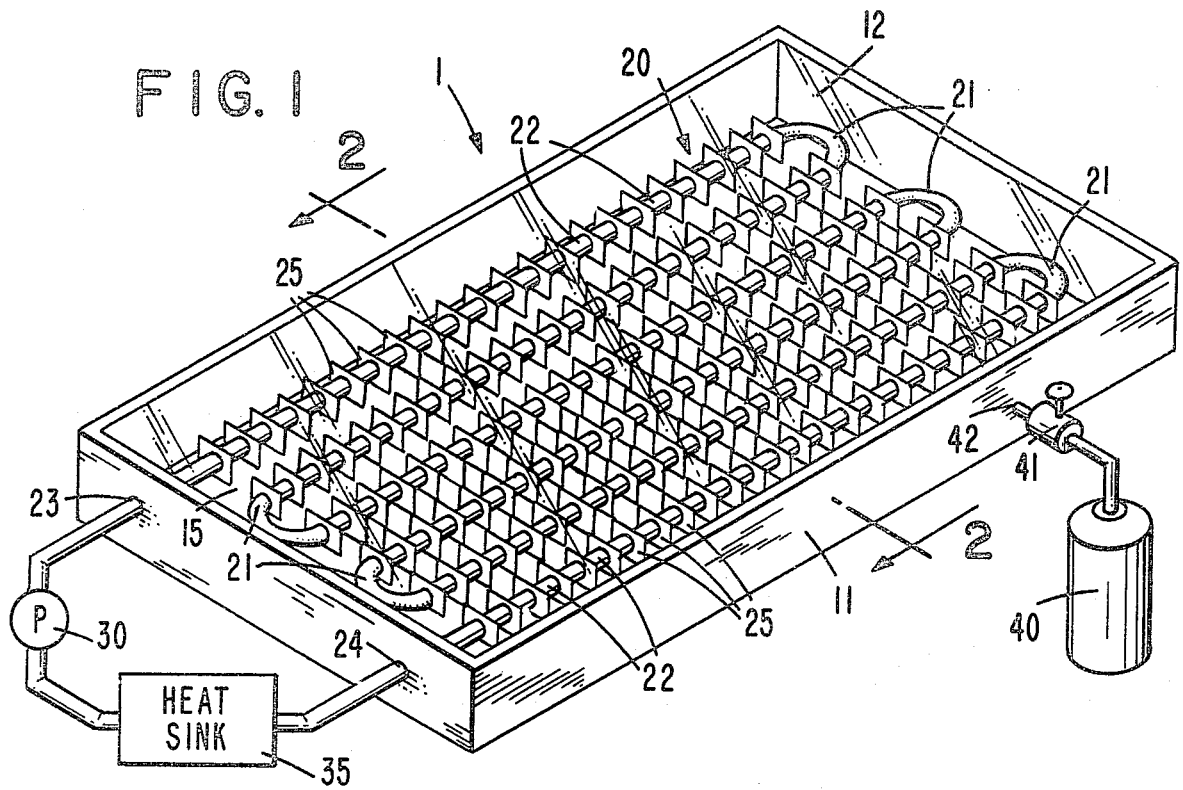
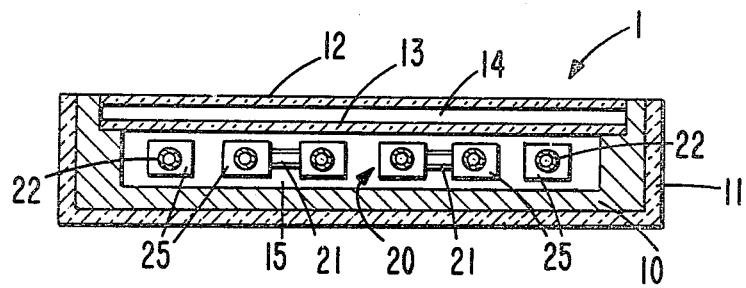
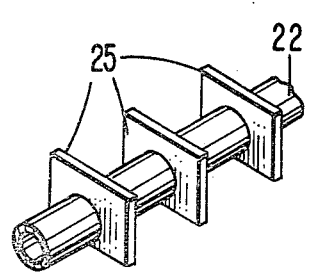
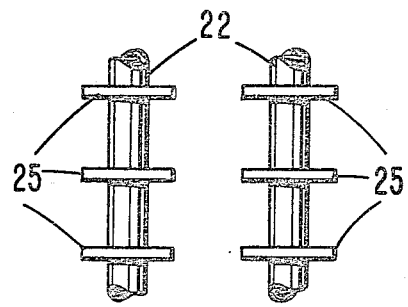

MULTI SYSTEMS SOLAR COLLECTOR

BACKGROUND OF THE INVENTION

The field of solar energy has recently spawned an enormous amount of interest as one of the most practical and efficient alternate energy sources, in an era when the world is becoming very conscious of dwindling energy resources. Some of the more recent developments in the area of technology commonly referred to as flat plate solar collectors are illustrated in recently issued U.S. Pat. Nos. 4,069,810; 4,036,208; and 4,018,211.

The flat plate solar collectors are distinguished from the more sophisticated and expensive rotating solar tracking devices in that they are stationary, fixed installations which rely on their energy absorbing characteristics and properties to collect all of the available energy from the sun as it moves across the surface of the flat plate during the course of the day.

The flat plate solar collectors are normally characterized by their utilization of radiation and conduction to heat a working fluid which is pumped through the collector, and then the heated fluid is passed through a heat exchanger to transfer heat energy to a storage medium for subsequent use.

Most, if not all, of the flat plate solar collectors found in the prior art, treat heat generated through convection as a problem and try to minimize this component by evacuating the chamber in which the radiation and conduction are being absorbed by the collector tube. Most people are of the opinion that the convection heating of the fluid present in the chamber reduces the total heat which can be absorbed by the collector tubes since the convection heat which is a by-product of the radiation and conduction is transferred to the walls of the chamber and subsequently lost to the system.

SUMMARY OF THE INVENTION

An object of the present invention is the provision of a multi systems solar collector which utilizes radiant, conduction and convection energy to transfer heat to the solar collector tubes.

Another object of the present invention is to introduce a dry gas into the collector chamber at a pressure greater than atmospheric as a working fluid to utilize convection energy.

A further object of the present invention is the provision of an improved spacing between adjacent fin elements and also between adjacent collector tubes to maximize the radiant energy absorbed by the unit.

Yet another object of the present invention is the provision of a multi systems solar collector assembly which is relatively inexpensive to manufacture, and which exhibits excellent operating characteristics due to its unique construction and usage of convection energy.

These and other objects, advantages and novel features of the instant invention will become apparent from the following detailed description of the invention when considered in conjunction with the accompanying drawings.

BRIEF DESCRIPTION OF THE DRAWINGS

FIG. 1 is a perspective view of the multi systems solar collector assembly of the instant invention;

FIG. 2 is a cross-sectional end view of the solar collector assembly taken through line 2—2 of FIG. 1;

FIG. 3 is a top plan view of the solar collector tube and fin configuration; and FIG. 4 is a detail view of the spacing between adjacent coils and adjacent fins.

DESCRIPTION OF THE PREFERRED EMBODIMENT

As can be seen by reference to FIG. 1, the solar collector assembly of the instant invention is designated generally as 1. The assembly comprises a deep framework 10 fabricated from metal, fiber or similar material. In the embodiment illustrated in FIG. 1, the dimensions are: length, eight feet; width, four feet; and depth, more than six inches; however, these dimensions are for purposes of illustration only. The bottom and sides of the framework 10 are covered with insulation material 11 of a sufficient depth to thermally insulate the interior of the assembly from the surrounding framework. Two spaced panes of clear glass 12 and 13, having between them a sealed and evacuated space 14, form a cover for the assembly, and create a chamber 15 which is thermally insulated from the surrounding atmosphere in a well known manner.

The heat of any solar collector is the collector tube, designated in this instance generally as 20. As can be seen by reference to FIG. 3, the chamber 15 contains a plurality of contiguous serpentine tube coils 21 initiating and terminating in straight tube sections 22. The collector tube 20 begins at inlet 23 and ends at outlet 24. A heat exchange working fluid such as water or ethylene glycol is forced by a pump 30 through the inlet 23 into the collector tube 20 where it absorbs heat energy, then through the outlet 24 into a heat sink or storage member 35, where it gives up the accumulated heat energy, and finally back to the pump 30 to form a closed loop system. The collector tube 20 is provided with a plurality of space fin elements 25 along its entire length which significantly enhance the ability of the collector 20 to absorb energy. The fins 25 are positioned around the periphery of the collector tube 20 and are secured thereto in any suitable manner.

The surface of the collector tube 20, fins 25 and the insulation 11 which is exposed to the rays of the sun, are painted with a dark color to absorb radiant energy. Black is the most widely accepted color since it has the least amount of reflectivity; however, a dark green has been found to be equally acceptable and in some instances more desirable. The coated surfaces in the chamber 15 and collector 20 now act to absorb solar energy when exposed to the rays of the sun.

The chamber 15 containing the collector tube 20 is operatively connected to a source 40 of dry gas such as oxygen, nitrogen or nitrous oxide. The dry gas supply line 24 is connected to a pressure regulator 41 which insures that the pressure of the dry gas in chamber 15 is maintained at a level that is greater than atmospheric pressure. Dry gas is chosen because it helps prevent fogging within the chamber, and also will reduce or eliminate sweating on the glass surface 13 due to condensation of any moisture present in the chamber 15.

When the multi systems solar collector assembly is in operation, the solar rays impinge on the coated surfaces to absorb heat energy. As a consequence, the surfaces of the chamber, collector tube and fins become heated, as does the pressurized dry gas. The heat in the chamber causes turbulence in the dry gas and this turbulence impinges on the fin and tube surfaces in much the same manner as a friction heater; however, in this instance the friction is not caused by a structural element moving through a fluid, but by the fluid moving past a stationary structure. The pressurization of the chamber enhances the heat generating properties of the fluid by well accepted physical principles. Therefore, a solar collector built in accordance with the teachings found in this specification will effectively utilize conduction, convection and radiant energy to transfer heat energy to the working fluid.

Referring now to FIG. 4 where the spacing between adjacent fins and adjacent collector tubes is illustrated, it can be seen that the space between adjacent fins is 90% or less than the height or width of a given square fin element, and the parallel spacing of the columns of fins (serpentine coils) is determined in the same manner, i.e. the closest point between opposed fin surfaces or parallel columns is 90% or less than the fin length or width. The reason for this particular spacing is to arrive at a spacing between adjacent elements which will optimize the exposed collector while minimizing the shadow cast on the energy absorbing components by one another as the solar profile changes from day to day and season to season.

It has also been determined that the optimum angle of disposition for this solar collector is perpendicular to the sun rays at one hour past high noon at mid-summer between the spring and fall equinox.

The operation of the multi system solar collector assembly by the instant invention is as follows: the chamber 15 is thermally isolated from the surrounding atmosphere by the insulation 11 and the evacuated double pane cover 12 and 13, which combine to retain any heat generated in the chamber, and reduce as much as possible the heat loss from the chamber due to conduction. When the sun's rays impinge upon the solar collector assembly, they pass through the clear thermally insulated cover 12 and 13 and the radiant energy present in the rays is absorbed by the dark painted surfaces found in the chamber 15. The rays which impinge directly upon the collector tubes, transfer radiant energy directly to the working fluid through the painted walls of the copper tubing from which the collector tubes are fabricated. The radiant energy which is not directly absorbed by the collector tubes, is absorbed by the fins 25 or the painted interior of the chamber 15. A major portion of the radiant energy which is absorbed by the fin elements is transferred to the collector tube via conduction. The radiant energy which is absorbed by the painted interior of the chamber heats the walls of the chamber and this heat is subsequently transferred to the atmosphere contained within the chamber. Since the atmosphere within the chamber is maintained at a level above atmospheric pressure, any increase in temperature caused by incident radiation, unabsorbed radiant energy, absorbed radiant energy in the chamber wall, and that portion of the absorbed radiant energy in the fins which is not transferred by conduction to the collector tube, increases the turbulence in the pressurized chamber. The convection turbulence of the pressurized dry gas increases as the collector assembly continues to be exposed to the direct rays of the sun, and this turbulence creates frictional forces which transfer heat both to the fins and to the collector tube itself. It can, therefore, be appreciated that a solar collector built in accordance with this invention adds a fourth dimension by convection absorption to the three dimensions of length, width and depth that deal with radiant and conduction principles of heat transfer.

Having thereby disclosed the subject matter of this invention, it should be obvious that many modifications, substitutions and variations of the invention are possible in light of the above teachings. It is, therefore, to be understood, that the invention may be practiced other than as specifically described, and should be limited only by the breadth and scope of the appended claims.

I claim:

1. A multi system solar collector assembly comprising:
    an insulated framework having a thermally insulated cover forming a chamber within the framework;
    a finned heat pipe collector tube having a plurality of serpentine coils disposed within the framework;
    a heat transfer fluid disposed in the collector tube; and
    a pressurized atmosphere within the chamber, comprising a dry gas, wherein said pressurized atmosphere has a value greater than atmospheric pressure, which is maintained by a pressure regulator operatively connected to said chamber; and whereby the solar collector assembly will transfer conduction, convection and radiant energy to said heat transfer fluid.

2. An assembly as in claim 1 wherein:
adjacent fins on the collector tube are spaced apart a distance of 90% or less than the height of an individual fin.

3. An assembly as in claim 2 wherein:
fins on adjacent coils of the collector tubes are spaced apart a distance of 90% or less than the width of an individual fin.

4. As assembly as in claim 1 wherein:
The radiation and conduction energy creates turbulence in the pressurized atmosphere within the chamber.

5. An assembly as in claim 4 wherein:
the turbulence in the pressurized atmosphere generates convection energy which is transferred to the working fluid.

* * * * *